United States Patent Office 3,317,997
Patented May 9, 1967

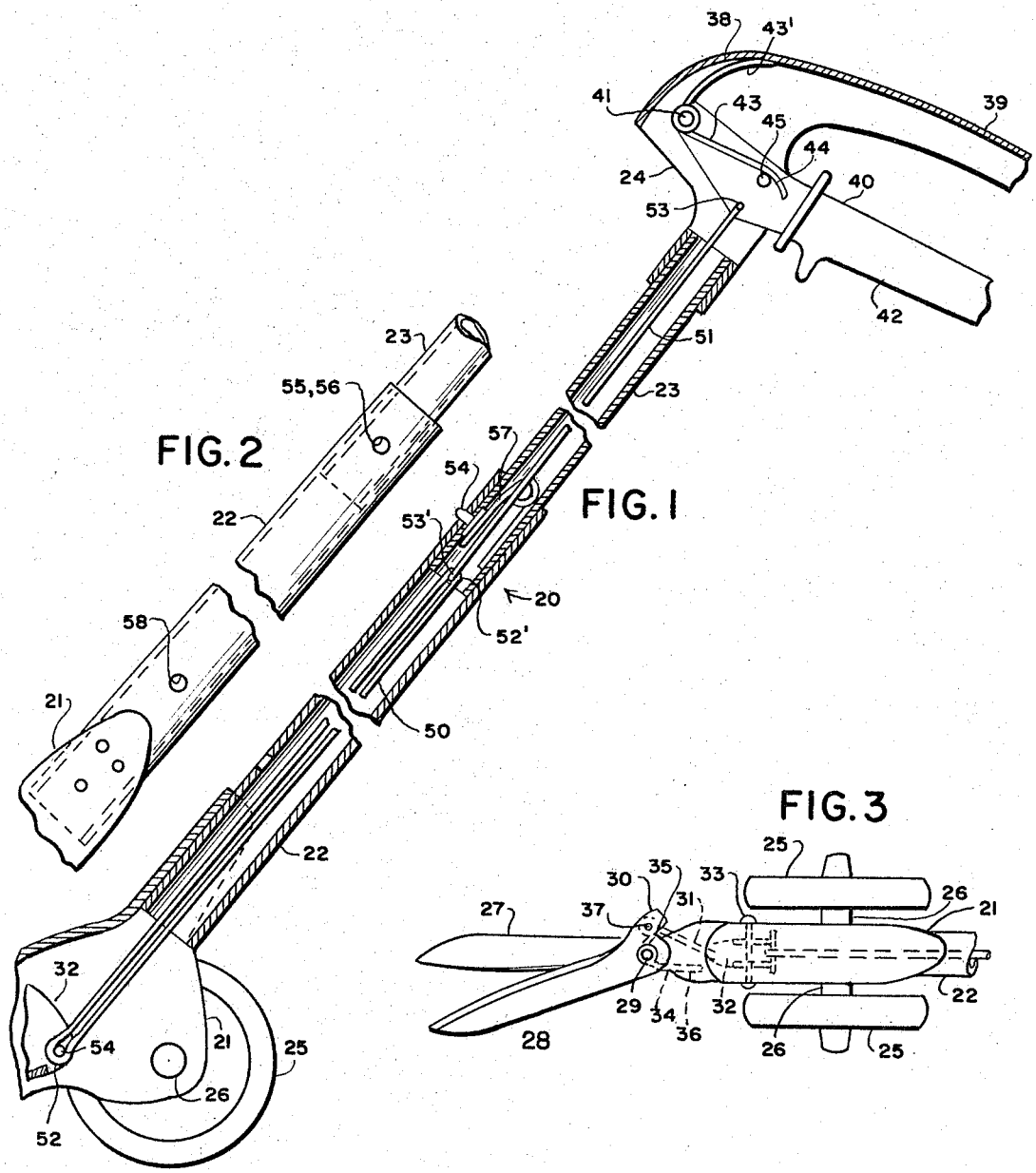

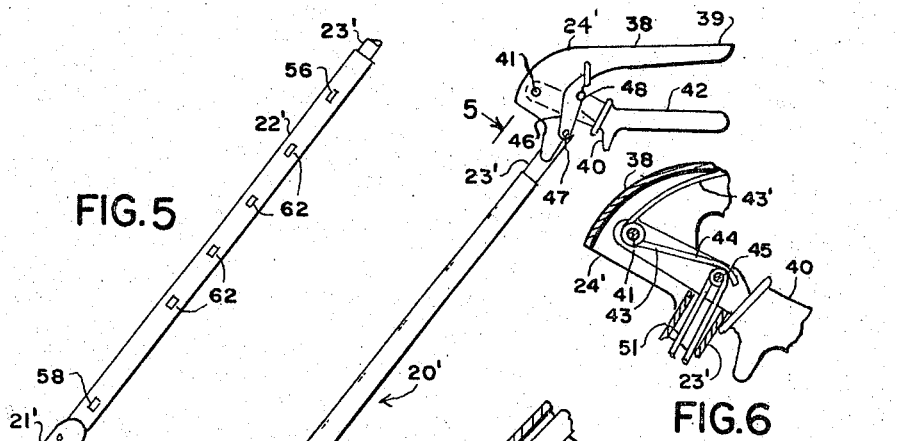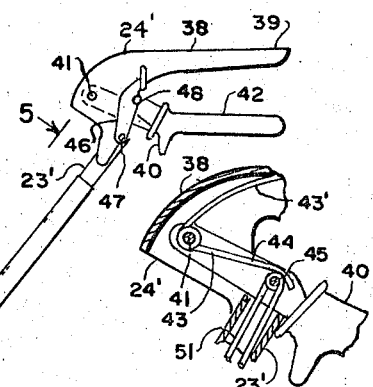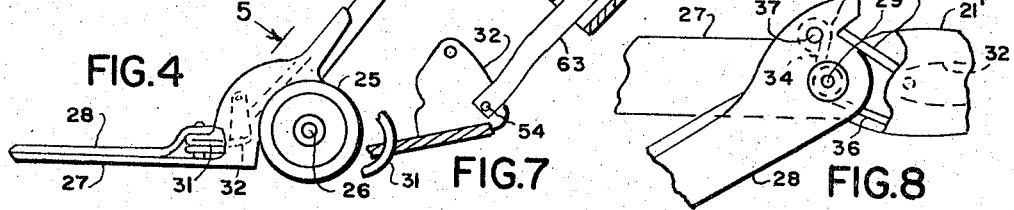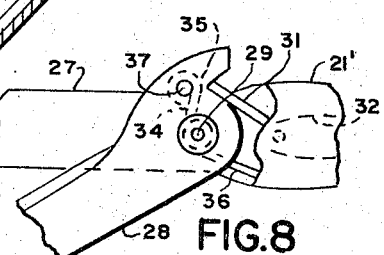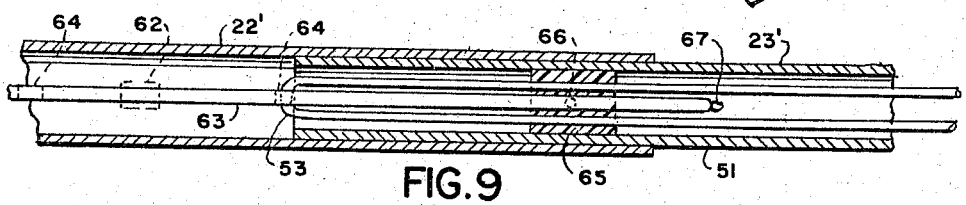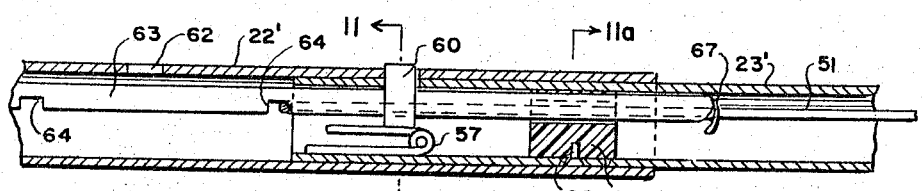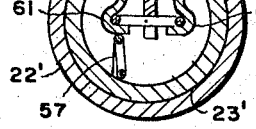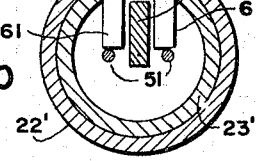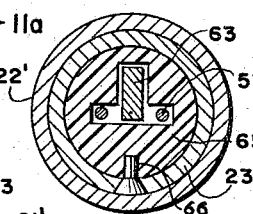

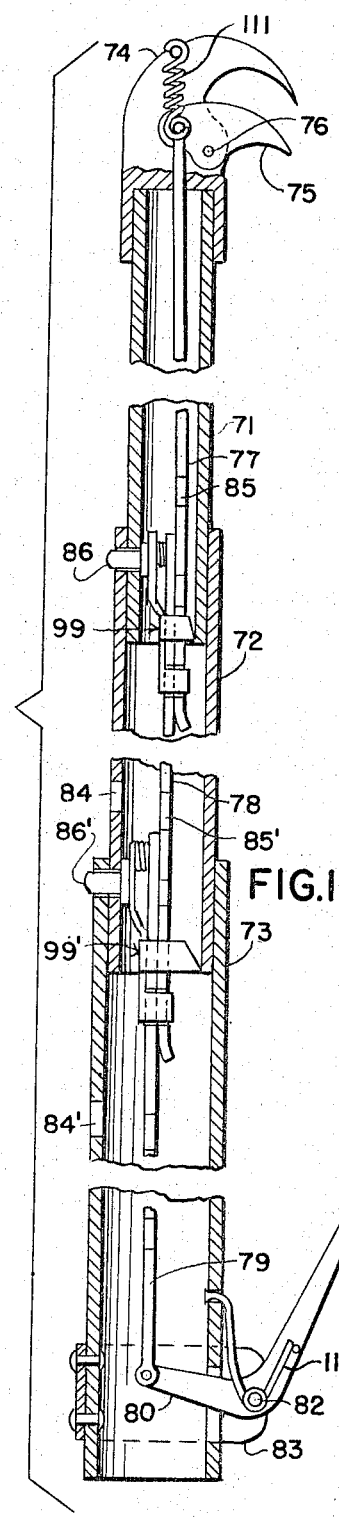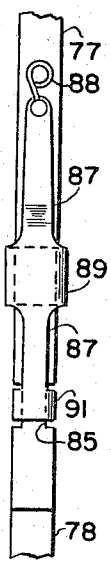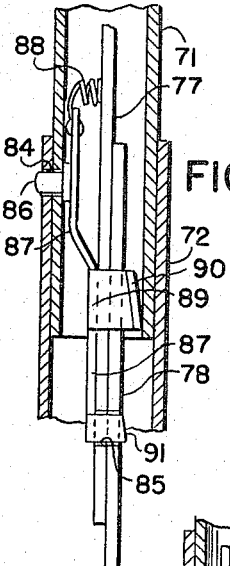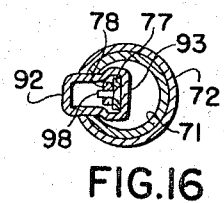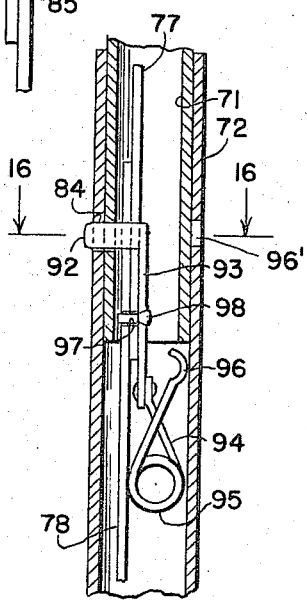

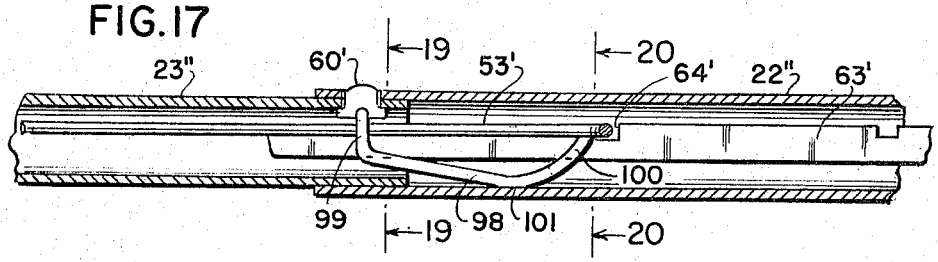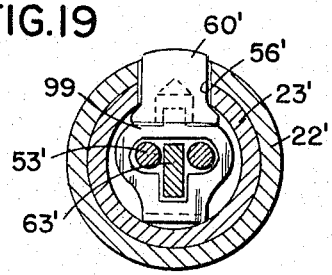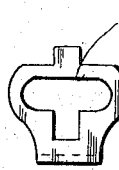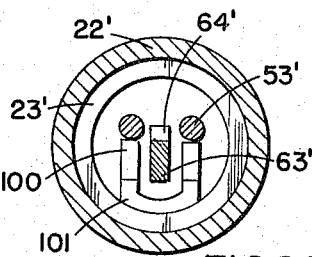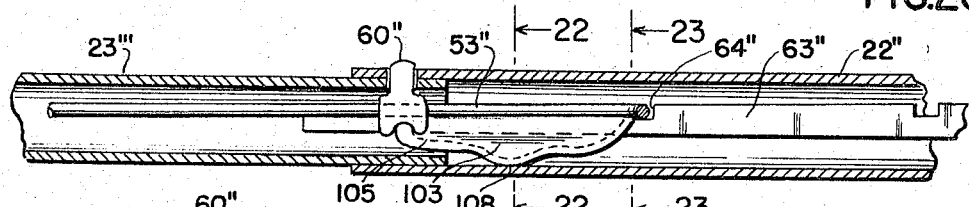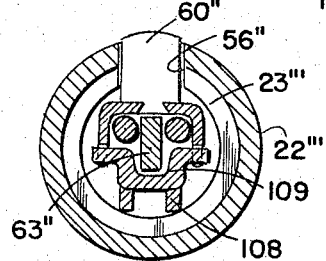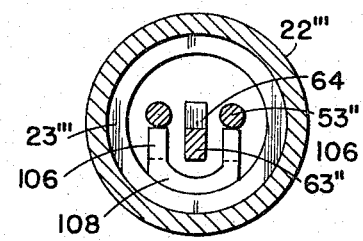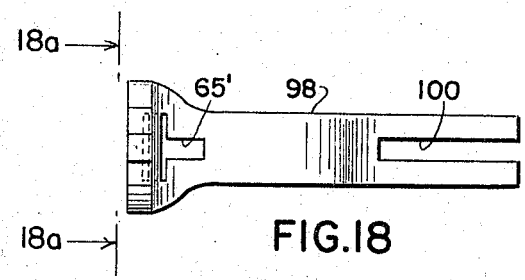

3,317,997
TELESCOPING ADJUSTABLE LONG HANDLE
MULTIPURPOSE SHEARS
Lars Hedstrom, Mendham, and Rudolph J. Wertepny, Orange, N.J., assignors to J. Wiss and Sons Co., Newark, N.J.
Filed Oct. 11, 1965, Ser. No. 505,092
13 Claims. (Cl. 30—248)

The present invention is a continuation-in-part of our copending application Ser. No. 472,626, filed July 16, 1965, now abandoned.

This invention relates to cutting tools, particularly to multipurpose gardening shears for cutting grass, for trimming edges of lawns, for pruning flower stems, hedges, bushes, long-handle pole lopping shears and the like.

This invention is also applicable for other tools, such as pliers, wire cutters and the like.

Gardening shears are known for a plurality of purposes, but most of these shears have relatively short handles, and in order to apply them, the user has to stoop down or kneel on the ground. Other gardening shears are known which have long handles, but these handles are not adjustable in length, do not have manually operable mechanisms which are equally adjustable in length, and cannot positively exert sufficient power to cut or prune even small stems of flower bushes, hedges, and the like. This invention is intended to overcome these disadvantages and shortcomings, and it consists in such novel features, construction arrangements, combinations of parts and improvements as may be shown and described in connection with the apparatuses herein disclosed by way of example only and as illustrative of preferred embodiments. Objects and advantages of the present invention will be set forth in part hereafter and in part will be obvious herefrom or may be learned by practicing the invention, the same being realized and attained by means of the instrumentalities and combinations pointed out in the appended claims.

It is the general object of the present invention to provide contrivances for manually operated multipurpose tools having a long, telescoping handle.

Another object of the present invention is to provide multipurpose gardening shears having a long handle, the length of which can be adjusted.

A further object of the present invention is to provide length-adjusting means for the handle of multipurpose gardening shears which can be adjusted without the use of tools, without taking the shears apart and without altering the operating mechanism of same.

Yet another object of the present invention is to provide general tools for cutting and gripping for a plurality of purposes, which are convenient to operate and are easy to adjust.

Furthermore, it is an object of the present invention to provide gardening shears with an adjustable long handle and with an adjustable operating mechanism, which is of a simple and sturdy construction.

Various further and more specific purposes, features and advantages will clearly appear from the detailed description given below taken in connection with the accompanying drawings which form part of this specification and illustrate merely by way of example various embodiments of the device of the invention. In the following description and in the claims, parts will be identified by specific names for convenience, but such names are intended to be as generic in their application to similar parts as the art will permit. Like reference characters denote like parts in the several figures of the drawings, in which:

FIG. 1 illustrates a longitudinal section of a telescoping collapsible long-handle gardening shears, partly broken away;

FIG. 2 is a top view of the telescoping collapsible handle of the gardening shears illustrated in FIG. 1, partly broken away;

FIG. 3 is a plan view of the gardening shears, with the handle broken away;

FIG. 4 is a side view of the telescoping adjustable long handle gardening shears according to a preferred embodiment;

FIG. 5 is a top view of the handle of the gardening shears shown in FIG. 4, partly broken away, viewed in the direction of the arrows 5;

FIG. 6 is a sectioned detail of the operating end of the handle, partly broken away;

FIG. 7 is a sectioned detail of the lower end of the handle, partly broken away, illustrating a part of the operating linkage mechanism of the shears;

FIG. 8 is a plan view of the shear blades, partly broken away, illustrating another part of the operating linkage of the shears;

FIG. 9 is a longitudinal section of the telescoping adjustable handle, partly broken away;

FIG. 10 is a side view of the longitudinal section of the telescoping adjustable handle shown in FIG. 9, partly broken away;

FIG. 11 is a transverse section of the telescoping handle, taken along the line 11—11 of FIG. 10;

FIG. 11a is a transverse section of the telescoping handle, taken along the line 11a—11a of FIG. 10;

FIG. 11b is a transverse section of another embodiment of an arrangement similar to that shown in FIG. 11.

FIG. 12 is a side view of another type of telescoping, adjustable shears, partly broken away, such as is used for pruning, pole lopping and the like purposes;

FIG. 13 is a partial longitudinal section of the telescoping, adjustable, multipurpose shears, showing the adjusting mechanism in detail;

FIG. 14 is a plan view of the adjusting mechanism shown in FIG. 13;

FIG. 15 is a partial longitudinal section of the telescoping, adjustable, multipurpose shears, showing another embodiment of the adjusting mechanism in detail;

FIG. 16 is a cross-section of the mechanism shown in FIG. 15, taken along the arrows 16—16 in FIG. 15;

FIG. 17 is a partial longitudinal section of the telescoping, adjustable, multipurpose shears, showing another form of the adjusting mechanism in detail;

FIG. 18 is a detail plan view of the adjusting mechanism shown in FIG. 17;

FIG. 18a is a cross-section of the adjusting mechanism shown in FIG. 18, taken along the line 18a—18a in FIG. 18;

FIG. 19 is a cross-section of the mechanism shown in FIG. 17, taken along the lines 19—19 in FIG. 17;

FIG. 20 is a cross-section of the mechanism shown in FIG. 17, taken along the lines 20—20 in FIG. 17;

FIG. 21 is a partial longitudinal section of the telescoping, adjustable, multipurpose shears, showing another embodiment of the adjusting mechanism in detail;

FIG. 22 is a cross-section of the mechanism shown in FIG. 21, taken along the lines 22—22 in FIG. 21; and FIG. 23 is a cross-section of the mechanism shown in FIG. 21, taken along the lines 23—23 in FIG. 21.

Referring now in more detail to the drawing illustrating certain embodiments by which the invention may be realized, there is in FIG. 1 a general gardening shears 20 and in FIG. 4 a gardening shears 20', both having the same basic component parts. Shears 20 have a carriage 21, or shear blade support, on the lower end, a lower tube 22 extending upwardly from carriage 21 and permanently attached thereto, an upper tube 23 slidably fitted into tube 22, and a handle 24, or grip, permanently attached to upper tube 23. Gardening shears 20' shown in FIG. 4 are basically composed of the same parts, that is, carriage 21', lower tube 22', upper tube 23' and handle 24'. A pair of wheels 25 is mounted on an axle 26 on carriage 21 (and 21'). Furthermore, the stationary blade 27 of the shears is permanently attached to the front end of carriage 21 (and 21'). The movable blade 28 of the shears is mounted on a vertical pivot 29 which is attached to stationary blade 27. Movable blade 28 has a rearward extension 30 to which a link 31 is connected. Link 31 is connected with one arm of a bell-crank member 32 which is rotatably arranged in carriage 21 (and 21') on a shaft 33. A wire spring 34 is wound around pivot 29 and abuts with its free ends 35 and 36 against the pin 37 on extension 30 and against the wall of carriage 21 (and 21') respectively.

Handle or grip 24 (FIG. 1) is permanently attached to upper tube 23. The handle consists of a stationary part 38 which has a grip 39 bent at an angle of approximately 90° to upper tube 23 and a movable lever 40. Movable lever 40 is pivotally mounted on shaft 41 in stationary part 38. Movable lever 40 has a handle 42 which is arranged in such manner as to cooperate with grip 39 for a one-hand operation. A wire spring 43 is wound around shaft 41 and has two ends 43', 44 which abut against the inside of stationary part 38 and against a pin 45 on movable lever 40, respectively. Spring 43 thus urges movable lever 40 downwardly away from grip 39 of stationary part 38.

Handle 24' (FIG. 4) is composed of the same parts as handle 24, but has a latch 46 mounted on a pin 47 on the outside of stationary part 38. Latch 46 engages a pin 48 on movable lever 40 for keeping shears 27, 28 in a closed position, when not in use.

Extending longitudinally of tubes 22, 23 are two elongated wire loops 50, 51, both of which have ends 52, 52' and 53, 53', respectively, bent in hairpin fashion. Hairpin end 52 of loop 50 is hooked on pin 54 of the other arm of bell-crank member 32; hairpin end 53 of loop 51 is hooked on movable part 40 of handle 24 (FIG. 1). Hairpin loops 52', 53' are arranged to engage in tension when telescoping upper tube 23 is fully extended from lower tube 22. A detent button protrudes through a hole 55 in upper tube 23 in such manner that it engages a corresponding hole 56 in lower tube 23 when the tubes are fully extended. A wire spring 57 is arranged to urge detent button 54 outwardly. In this position, handle 20 is solidly set in operable position, while loops 50, 51 are fully engaged under tension. By operating handle 42 against grip 39, movable blade 28 will be pulled against stationary blade 27, thus performing the desired shearing action. The return stroke of blade 28 and handle 42 is effected by springs 34 on the shears and 42 on the movable part 40, respectively.

A second hole 58 is located in lower tube 22 near the carriage end of this tube. By pressing button 54 down, inner tube 23 will become unlocked, and the upper part of the handle can be telescopingly moved into lower tube 22 until button 54 snaps into hole 58. Loops 50, 51 can slide freely in one another. In this lower position the shears are secured and inoperable; furthermore, they now take the least possible space for packing, shipping and storing.

Another embodiment of the invention, using the same basic parts as described before, is shown in FIGS. 4 and 5. Upper tube 23' carries a detent button 60, which basically consists of a piece of formed sheet metal. It extends downwardly into tube 23', and there the two free ends 61, 61' embrace the lower end of upper loop 51, thus holding hairpin end 53. Spring 57 again is arranged to hold detent button 60 upwardly to insure that it protrudes through a hole in lower tube 22' for locking the two tubes together. Lower tube 22' has not only an upper hole 56 and a lower end hole 58 such as shown in FIGS. 1 and 2, but has a plurality of holes 62 arranged between them. Lower loop 50 is replaced by a bar 63 which is hooked on pin 54 of bell-crank member 32. Bar 63 has a plurality of notches 64, corresponding in number to holes 56, 58 and 62. The free end of bar 63, extending longitudinally of tube 22' can slide freely between the two wires of loop 51, but notches 64 are made in such a manner that hairpin end 53 may drop into notches 64 under the pressure of cantilever hairpin end 53 anchored in T slot of bushing 65. Holes 56, 58 and 62 are spaced in such relationship to notches 64 that button 60 snaps into one of the mentioned holes when hairpin end 53 snaps into the corresponding notch. During indexing, this relationship is maintained by means of two springs. Wire spring 34 opens blade 28 (FIG. 8) and by way of link 31 moves bell-crank 32 which, in turn, locates rod 63 in a fixed position relative to lower tube 22'. Upper spring 43 in handle 24 bears on pin 45 around which upper end of wire loop 51 is coiled in a complet circle so that loop 51 may be returned to a fixed position relative to upper tube 23' during indexing.

Due to this structure, the telescoping long handle has not only a lower and an upper position, but accommodates intermediate lengths whereby the cooperation of notched bar 63 with hairpin end 53 provides for fully operating condition in each one of these positions. It is evident from FIGS. 10 and 11 that by pushing button 60 downwardly, the upper and the lower tubes are unlocked while simultaneously lower ends 61, 61' of button 60 lift hairpin end 53 out of the corresponding notch of bar 63. In order to insure that end 53 will lift out of the notch in bar 63, a T slot guide or bushing 65 may be provided toward the end of tube 23. Wire loop 51 passes through bushing 65 in such manner that hairpin end portion 53 acts as a cantilever beam with the fulcrum at bushing face 65. When button 60 is depressed, the T slot contains and guides both hairpin end 53 and notched rod 63 to that there is no relative downward or upward motion between the two pieces in bushing 65. Longitudinal movement is not restricted in bushing 65. In order to index, the downward movement of button 60 causes the hairpin end 53 to move downward thus disengaging it from the notch 64. This may be seen from FIG. 11b, which is an alternate structure of FIG. 11 eliminating spring 57. Hairpin end 53 is restrained by T slot guide 65' in bushing 65 in such manner that the hairpin acts as a cantilever spring which provides the necessary spring tension to hold hairpin end 53 in slot 64 during the operation of the device. The cantilever spring effect also serves to keep button 60 in the upward position where it acts as a shear pin locking the two tubes 22' and 23' together. Without bushing 65, loop 51 would have a tendency to act as a continuous beam. The bushing may be made of a plastic material having a low friction coefficient and is anchored in the wall of tube 23' by a plug 66. A pin or clip 67 is provided at the end of bar 63, which protrudes between the legs of loop 51, acting as a stop when it engages hairpin end 53 of loop 51. This prevents tubes 22' and 23' from separating.

A third embodiment of the invention is shown in FIGS. 12, 13, 14 in which the long handle consists of three adjustable, telescoping tubes 71, 72, 73. A stationary blade 74 of shears capable of being used for snipping, pruning or lopping purposes, is permanently attached to the end of tube 71. The movable blade 75 of the said shears is rotatably located on stationary blade 74 by means of a pin 76. A first substantially flat bar 77 is articulatedly attached to movable blade 75. Bar 77 extends through tube 71 partly into tube 72, where a second substantially flat bar 78 is arranged, overlapping partly first bar 77. Second bar 78 in turn extends through tube 72 partly into tube 73 where a third substantially flat bar 79 is located. Bars 78 and 79 overlap in a similar manner as bars 77 and 78. The lower end of bar 79 is linked to one end 80 of the bell-crank-shaped hand-operated lever 81 which is rotatably located on a pin 82 in a bracket 83 on the lower end of tube 73. Tubes 71, 72 have a plurality of holes 84, 84' spaced longitudinally, and bars 77, 78 have notches 85, 85' spaced apart at the same distances as holes 84, 84'. A latching device 99, 99' is arranged at each one of the ends where the bars overlap. The latching devices are operable by means of buttons 86, 86', engaging holes 84, 84'. The lower end of each button 86, 86' abuts against lever arm 87 of latching device 99, 99'. Lever arm 87 is held in constant contact with the lower end of the respective buttons 86, 86' by spring 88. A sleeve 89 projects from lever arm 87. Bars 77 and 78 slidingly fit in sleeve 89 at the area where they overlap. Sleeve 89 has a slanted bottom 90 which permits a rocking motion of the latching device 99 and provides a fulcrum for the rocking motion by abutting against the inside of the wall of tube 71 with the lowest edge of slanted bottom 90. Lever arm 87 extends beyond sleeve 89 and has on its end a U-shaped shoe 91 which fits into the notches 85 of bar 78.

Thus, by pushing button 86, tubes 71, 72 become unlocked for telescopingly sliding in one another; by the same action on pushbutton 86, lever 87 rocks about fulcrum edge of bottom 90, and shoe 91 is simultaneously lifted out of engagement with notch 85, so that bars 77, 78 also can slide freely through sleeve 89. Obviously, the spacing of holes 84, 84' and notches 85, 85' must be equal so that the adjustment of telescoping tubes 71, 72 and the adjustment of sliding pull bars 77, 78 are equal and simultaneous. Blade 75 and lever arm 80 must be in a fixed position during indexing. This may be accomplished manually or by means of springs 110, 111 similar to the two springs 34 and 43 in FIGS. 6 and 8.

Another embodiment of the latching device is shown in FIGS. 15 and 16. Pushbutton 92 is an integral part of lever arm 93 which slidingly embraces bars 77, 78. A spring 94 is attached to the free end of lever arm 93. Spring 94 forms a loop 95 which supports the latching device, and the free end 96 of spring 94 abuts against the inside of the wall of tube 72. Bar 78 has a plurality of holes 97 which are spaced apart at the same distances as holes 84 in tube 72. A hardened pin 98 is riveted on lever arm 93 in such manner that it engages one of the holes 97 when adjustment of the telescoping handle is performed. In order to limit the travel of the adjustment, a hole 96' is provided in the wall of tube 72, into which free end 96 of spring 94 may drop.

A further embodiment of the latching device is shown of FIGS. 17 to 20. A rocking blade 98, stamped out of a piece of steel, abuts with one end 99 against pushbutton 60', and with the other, forked end 100 against wire loop 53'. Blade 98 is shaped in such manner that it rests with the bend 101 on the inner wall of tube 22". A T-shaped slot 102 adjacent end 99 permits bar 63' and loop 53' to pass through freely. Thus, when pushbutton 60' is pressed down, it pushes bar 63' downward whereas wire loop 53' is pushed upward by forked end 100, lifting wire loop 53' out of notch 64' while tubes 22" and 23" are disengaged simultaneously. Handle 24' now is free to be adjusted longitudinally.

Yet another embodiment of the latching device is shown in FIGS. 21 to 23. A rocking member 103 is provided, consisting of a channelled piece of steel. The end 105 of the upright flanges 104 of member 103 abuts against pushbutton 60", the other end 106 of flanges 104 abuts against the wire loop 53". Member 103 is shaped in such manner that it rests with a buckle 108 on the inner wall of tube 22"'. Button 60" has in this case a forked end 109 so that bar 63" and wire loop 53" passes freely through. By pressing button 60", tubes 22"" and 23"' are disengaged, and bar 63" and wire loop 53" are depressed by button 60". The rocking action of member 103 lifts loop 53" out of notch 64" of bar 63".

In both cases, as illustrated in FIGS. 17 to 20, and 21 to 23, the combined downward pressing action on bars 63', 63", respectively, and upward lifting action on wire loops 53', 53", respectively, causes a rapid disengagement of bars and wire loops, respectively, with a movement of pushbutton 60' (or 60") which is only a fraction of the lifting disengagement, depending on the ratio of the length of the rocking arms of blade 98 and of member 103, respectively.

It is understood that the term "cutting blades" as used in the specification and claims is not to be construed as being limited to shearing action, but also includes blades used in gripping and clamping tools.

While the invention has been described and illustrated with respect to certain preferred examples which give satisfactory results, it will be understood by those skilled in the art after understanding the principle of the invention that various other changes and modifications may be made without departing from the spirit and scope of the invention, and it is intended therefore in the appended claims to cover all such changes and modifications.

We claim:

1. Long-handle, multipurpose tool, comprising in combination: a substantially long, telescoping handle, said handle consisting of at least two tubular parts, one of said parts adapted to slidingly move within the other of said parts; a stationary blade affixed to one of said parts; a movable blade pivotally mounted on said stationary blade; a movable lever rotatably mounted on the other of said parts; at least two members located in said handle, said members operable with one another when under tension, one of said members being linked to said movable blade, the other of said members being linked to said lever, said members being slidably arranged with one another, whereby the closing of said lever activates one of said members which in turn activates the other of said members which in turn closes said blades; and means for holding said parts of said handle in an extended and collapsed position.

2. Long-handle, multipurpose tool, comprising in combination: a substantially long, telescoping handle, said handle comprising at least a lower tubular part and an upper tubular part, one of said parts adapted to slidingly move within the other of said parts; a stationary blade connected to said lower part; a movable blade pivotally mounted on said stationary blade; a hand grip connected to said upper part; a bell-crank element linked with said movable blade; a movable lever rotatably mounted on said grip; two members located in said handle, said members operable with one another when under tension, one of said members being attached to said element, the other one of said members being attached to said lever, said members being slidably arranged with one another; a spring-loaded detent button in said upper part; said lower part having at least two detent holes, said button arranged for cooperating with said detent holes for holding said upper and lower parts of said handle in an extended and in a collapsed position, respectively, whereby the closing of said lever activates one of said members which in turn activates the other of said members which in turn closes said blades.

3. Long-handle, multipurpose tool, comprising in combination: a carriage; a stationary blade connected to said carriage; a movable blade pivotally mounted on said stationary blade; a substantially long, telescoping handle, said handle comprising at least a lower tubular part and an upper tubular part, one of said parts adapted to slidingly move within the other of said parts, said lower part being connected to said carriage; a hand grip connected to said upper part; a bell-crank element rotatably mounted on said carriage, said element having a linkage connection with said movable blade; a movable lever rotatably mounted on said grip; two members located in said handle, said members operable with one another when under tension, one of said members being attached to said element, the other one of said members being attached to said lever, said members being slidably arranged with one another; a spring-loaded detent button in said upper part; said lower part having at least two detent holes, said button arranged for cooperating with said holes for holding said upper and lower parts of said handle in an extended and in a collapsed position, respectively, whereby the closing of said lever activates one of said members which in turn activates the other of said members which in turn closes said blades.

4. Long-handle, multipurpose tool, comprising in combination: a carriage; a stationary blade connected to said carriage; a movable blade pivotally mounted on said stationary blade; a substantially long, telescoping handle, said handle consisting of a lower tubular part and an upper tubular part, one of said parts adapted to slidingly move within the other of said parts, said lower part being connected to said carriage; a hand grip connected to said upper part; a bell-crank element rotatably mounted on said carriage, said element having a linkage connection with said movable blade; a movable lever rotatably mounted on said grip; two members located in said handle, said members operable with one another when under tension, one of said members being attached to said element, the other one of said members being attached to said lever, said members being slidably arranged with one another; a spring-loaded detent button in said upper part; said lower part having at least two detent holes, said button arranged for cooperating with said holes for holding said upper and lower parts of said handle in an extended and in a collapsed position, respectively; first spring means connected to said movable blade and said stationary blade adapted to hold said blades in an open position; and second spring means connected to said lever and to said grip adapted to hold said lever and said grip in an open position, whereby the closing of said lever activates one of said members which in turn activates the other of said members which in turn closes said blades.

5. Long-handle, multipurpose tool, comprising in combination: a substantially long, telescoping handle, said handle comprising at least a lower tubular part and an upper tubular part, one of said parts adapted to slidingly move within the other of said parts; a stationary blade connected to said lower part; a movable cutting blade pivotally mounted on said stationary blade; a hand grip connected to said upper part; a bell-crank element linked with said movable blade; a movable lever rotatably mounted on said grip; two members located in said handle, said members operable with one another when under tension, each of said members consisting of two extended wire loops, said loops having hairpin ends, one of said loops being attached to said element, the other one of said loops being attached to said lever, said loops being slidably arranged with one another; a spring-loaded detent button in said upper part; said lower part having at least two detent holes, said button arranged for cooperating with said holes for holding said upper and lower parts of said handle in an extended and in a collapsed position, respectively, whereby the closing of said lever activates one of said members which in turn activates the other of said members which in turn closes said blades when said handle is in said extended position.

6. Long-handle, multipurpose tool, comprising in combination: a carriage; a stationary cutting blade connected to said carriage; a movable cutting blade pivotally mounted on said stationary blade; a substantially long, telescoping handle, said handle consisting of a lower tubular part and an upper tubular part, one of said parts adapted to slidingly move within the other of said parts, said lower part being connected to said carriage; a hand grip connected to said upper part; a bell-crank element rotatably mounted on said carriage; said element having a linkage connection with said movable blade; a movable lever rotatably mounted on said grip; two members located in said handle, said members operable with one another when under tension, each of said members consisting of two extended wire loops, said loops having hairpin ends, one of said loops being attached to said element, the other one of said loops being attached to said lever, said loops being slidably arranged with one another; a spring-loaded detent button in said upper part; said lower part having at least two detent holes, said button arranged for cooperating with said holes for holding said upper and lower parts of said handle in an extended and in a collapsed position, respectively, whereby the closing of said lever activates one of said members which in turn activates the other of said members which in turn closes said blades when said handle is in said extended position.

7. Long-handle, multipurpose tool, comprising in combination: a carriage; a stationary cutting blade connected to said carriage; a movable cutting blade pivotally mounted on said stationary blade; a substantially long, telescoping handle, said handle consisting of a lower tubular part and an upper tubular part, one of said parts adapted to slidingly move within the other of said parts, said lower part being connected to said carriage; a hand grip connected to said upper part; a bell-crank element rotatably mounted on said carriage, said element having a linkage connection with said movable cutting blade; a movable lever rotatably mounted on said grip; two members located in said handle, said members operable with one another when under tension, each of said members consisting of two extended wire loops, said loops having hairpin ends, one of said loops being attached to said element, the other one of said loops being attached to said lever, said loops being slidably arranged with one another; a spring-loaded detent button in said upper part; said lower part having at least two detent holes, said button arranged for cooperating with said holes for holding said upper and lower parts of said handle in an extended and in a collapsed position, respectively; first spring means connected to said movable blade and said stationary blade adapted to hold said blades in an open position; and second spring means connected to said lever and to said grip adapted to hold said lever and said grip in an open position, whereby the closing of said lever activates one of said members which, in turn, activates the other of said members which, in turn, closes said blades.

8. Long-handle, multipurpose tool, comprising in combination: a substantially long, adjustable, telescoping handle, said handle consisting of a lower tubular part and an upper tubular part, one of said parts adapted to move slidingly within the other of said parts; a stationary blade connected to said lower part; a carriage; a movable cutting blade pivotally mounted on said stationary blade; a hand grip connected to said upper part; a bell-crank element linked with said movable blade; a movable lever rotatably mounted on said grip; two members located in said telescoping long handle, said members operable with one another under tension, the upper one of said members consisting of an elongate wire loop having one hairpin end, one of said ends being articulated on said movable lever, the lower one of said members consisting of a bar, said bar having a plurality of notches spaced apart from one another, one end of said bar being articulated on said linkage means; and a spring-loaded detent button in said upper part, said lower part having a plurality of holes spaced apart from one another adapted to register with the spacing of said notches, said holes adapted to cooperate with said detent button while said notches in said bar are adapted to cooperate with said hairpin end of said wire loop; means on said detent button for holding said hairpin end in said notches; said detent button holding said upper part of said lower part in a plurality of longitudinal positions adapted to register with said plurality of holes, said means on said button simultaneously engaging said hairpin end of said upper loop in tension engagement with a corresponding notch of said bar, whereby the closing of said lever activates said loop which, engaged in a notch of said bar, activates said bar which in turn closes said blades.

9. Long-handle, multipurpose tool, comprising in combination: a carriage; a stationary cutting blade connected to said carriage; a movable cutting blade pivotally mounted on said stationary blade; a substantially long, adjustable, telescoping handle, said handle consisting of a lower tubular part and an upper tubular part, one of said parts adapted to move slidingly within the other of said parts, said lower part connected to said carriage; a hand grip connected to said upper part; a bell-crank element rotatably mounted on said carriage, said element having a linkage connection with said movable cutting blade; a movable lever rotatably mounted on said grip; two members located in said telescoping long handle, said members operable with one another under tension, the upper one of said members consisting of an elongated wire loop having one hairpin end, one of said ends being articulated on said movable lever, the lower one of said members consisting of a bar, said bar having a plurality of notches spaced apart from one another, one end of said bar being articulated on said linkage means; and a spring-loaded detent button in said upper part, said lower part having a plurality of holes spaced apart from one another adapted to register with the spacing of said notches, said holes adapted to cooperate with said detent button while said notches in said bar are adapted to cooperate with said hairpin end of said wire loop; means on said detent button for holding said hairpin end in said notches; said detent button holding said upper part and said lower part in a plurality of longitudinal positions adapted to register with said plurality of holes, said means on said button simultaneously engaging said hairpin end of said upper loop in tension engagement with a corresponding notch of said bar, whereby the closing of said lever activates said loop which, engaged in a notch of said bar, activates said bar which in turn closes said blades.

10. Long-handle, multipurpose tool, comprising in combination: a carriage; a stationary cutting blade connected to said carriage; a movable cutting blade pivotally mounted on said stationary blade; a substantially long, adjustable, telescoping handle, said handle consisting of a lower tubular part and an upper tubular part, one of said parts adapted to move slidingly within the other of said parts, said lower part connected to said carriage; a hand grip connected to said upper part; a bell-crank element rotatably mounted on said carriage, said element having a linkage connection with said movable cutting blade; a movable lever rotatably mounted on said grip; two members located in said telescoping long handle, said members operable with one another under tension, the upper one of said members consisting of an elongated wire loop having one hairpin end, one of said ends being articulated on said movable lever, the lower one of said members consisting of a bar, said bar having a plurality of notches spaced apart from one another, one end of said bar being articulated on said linkage means; and a spring-loaded detent button in said upper part, said lower part having a plurality of holes spaced apart from one another adapted to register with the spacing of said notches, said holes adapted to cooperate with said detent button while said notches in said bar are adapted to cooperate with said hairpin end of said wire loop; means on said detent button for holding said hairpin end in said notches; said detent button holding said upper part and said lower part in a plurality of longitudinal positions adapted to register with said plurality of holes, said means on said button simultaneously engaging said hairpin end of said upper loop in tension engagement with a corresponding notch of said bar, first spring means connected to said movable blade and said stationary blade adapted to hold said blades in an open position, second spring means connected to said movable lever and to said grip adapted to hold said lever and said grip in an open position, whereby the closing of said lever activates said loop which, engaged in a notch of said bar, activates said bar which in turn closes said blades.

11. Long-handle, multipurpose tool comprising in combination: a stationary blade, a movable blade pivotally mounted on said stationary blade; a substantially long, adjustable, telescoping handle, said handle consisting of at least two tubular parts, one of said parts adapted to move slidingly within the other, respectively; a bracket mounted on one of said tubular parts, a bell-crank element rotatably mounted on said bracket, said element having a linkage connecting with said movable blade; a hand grip having a movable lever rotatably mounted on one of said tubular parts; at least two adjustable members located in said handle, said members operable with one another under tension, said members consisting of flat bars, one of said bars having one notch, the other one of said bars having a plurality of notches spaced apart from one another, one end of one of said bars being articulated on said movable blade, one end of the other one of said bars being linked to said movable lever; a spring-loaded detent button in one of said tubular parts, said other one of said tubular parts having a plurality of holes spaced apart from one another, said holes being adapted to register with the spacing of said plurality of notches on the other one of said bars, said holes adapted to cooperate with said detent button; and means cooperating with said button for holding said adjustable members by means of said notches in a plurality of longitudinal positions adapted to register with said plurality of holes, said cooperating means simultaneously holding said notch on said one of said bars with any one of said plurality of notches together on said other one of said bars in locking engagement.

12. Long-handle, multipurpose tool, comprising in combination: a substantially long, adjustable, telescoping handle, said handle consisting of a lower tubular part and an upper tubular part, one of said parts adapted to move slidingly within the other of said parts; a stationary blade connected to said lower part; a movable cutting blade pivotally mounted on said stationary blade; a movable lever rotatably mounted on said upper part; two members located in said telescoping long handle, said members operable with one another under tension, the upper one of said members consisting of an elongated wire loop having one hairpin end, one of said ends being articulated on said movable lever, the lower one of said members consisting of a bar, said bar having a plurality of notches spaced apart from one another, one end of said bar being linked to said movable blade; and a spring-loaded detent button in said upper part, said lower part having a plurality of holes spaced apart from one another adapted to register with the spacing of said notches, said holes adapted to cooperate with said detent button while said notches in said bar are arranged for cooperating with said hairpin end of said wire loop; a rocking member having a forked end, said forked end abutting the two legs of said loop and the other end of said member abutting said button, whereby when said button is depressed, said member will lift said loop from said notch; said detent button holding said upper part and said lower part in a plurality of longitudinal positions adapted to register with said plurality of holes, whereby the closing of said lever activates said loop which, engaged in a notch of said bar, activates said bar which in turn closes said blades.

13. Long-handle, multipurpose tool, comprising in combination: a stationary blade; a movable blade pivotally mounted on said stationary blade; a substantialy long, adjustable, telescoping handle, said handle consisting of a plurality of tubular parts, each one of said parts adapted to move slidingly within the other, respectively; a bracket mounted on one of said tubular parts, a bell-crank element rotatably mounted on said bracket, said element having a linkage connecting with said movable blade; a hand grip having a movable lever rotatably mounted on one of said tubuluar parts; a plurality of adjustable members located in said handle, said members operable with one another under tension, said members substantially consisting of flat bars, one of said bars having one notch, the other bars having a plurality of notches spaced apart from one another, one end of one of said bars being articulated on said movable blade, one end of one of the other of said bars being linked to said movable lever; a spring-loaded detent button in each one of said plurality of tubular parts, said tubular parts having a plurality of holes spaced apart from one another, said holes adapted to register with the spacing of said plurality of notches on said other bars, said holes adapted to cooperate with said detent button; and means cooperating with said button for holding said adjustable members by means of said notches in a plurality of longitudinal positions adapted to register with said plurality of holes, said cooperating means simultaneously holding said notch on said one of said bars with any one of said plurality of notches together on said other bars in locking engagement.

References Cited by the Examiner
UNITED STATES PATENTS

| | | | |
|---|---|---|---|
| 1,944,917 | 1/1934 | Bergmann | 30—248 |
| 2,228,635 | 1/1941 | Magennis | 30—249 X |
| 2,504,405 | 5/1950 | Fletcher | 30—249 |

WILLIAM FELDMAN, *Primary Examiner.*

J. C. PETERS, *Assistant Examiner.*